(12) United States Patent
Kwon et al.

(10) Patent No.: US 8,064,172 B2
(45) Date of Patent: *Nov. 22, 2011

(54) METHOD AND APPARATUS COUPLING TO A SLIDER IN A HARD DISK DRIVE FOR MICROACTUATION

(75) Inventors: Haesung Kwon, San Jose, CA (US); Hyung Jai Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1264 days.

This patent is subject to a terminal disclaimer.

(21) Appl. No.: 11/323,778

(22) Filed: Dec. 30, 2005

(65) Prior Publication Data

US 2006/0181812 A1    Aug. 17, 2006

Related U.S. Application Data

(63) Continuation-in-part of application No. 11/017,540, filed on Dec. 15, 2004, said application No. 11/323,778 is a continuation-in-part of application No. 10/713,616, filed on Nov. 13, 2003, now abandoned, and a continuation-in-part of application No. 10/903,730, filed on Jul. 29, 2004, now Pat. No. 7,336,436, and a continuation-in-part of application No. 10/757,238, filed on Jan. 13, 2004, now Pat. No. 7,130,160.

(60) Provisional application No. 60/530,712, filed on Dec. 18, 2003.

(51) Int. Cl.
*G11B 5/56* (2006.01)

(52) U.S. Cl. .................................. 360/294.4; 360/245.3

(58) Field of Classification Search ............... 360/294.4, 360/294.3, 245, 245.3

See application file for complete search history.

(56) References Cited

U.S. PATENT DOCUMENTS

| | | | |
|---|---|---|---|
| 5,954,079 A * | 9/1999 | Barth et al. | 137/13 |
| 5,978,752 A | 11/1999 | Morris | |
| 6,069,771 A * | 5/2000 | Boutaghou et al. | 360/294.4 |
| 6,118,637 A * | 9/2000 | Wright et al. | 360/294.4 |
| 6,246,552 B1 * | 6/2001 | Soeno et al. | 360/294.4 |
| 6,275,454 B1 | 8/2001 | Boutaghou | |
| 6,414,827 B1 | 7/2002 | Young et al. | |
| 6,501,625 B1 | 12/2002 | Boismier et al. | |
| 6,570,730 B1 | 5/2003 | Lewis et al. | |
| 6,611,399 B1 | 6/2003 | Mae et al. | |
| 6,590,748 B2 | 7/2003 | Murphy et al. | |
| 6,718,764 B1 * | 4/2004 | Sarkar et al. | 60/527 |
| 6,760,196 B1 * | 7/2004 | Niu et al. | 360/294.6 |
| 6,930,860 B1 * | 8/2005 | Coffey | 360/294.4 |
| 6,940,697 B2 | 9/2005 | Jang et al. | |
| 6,950,266 B1 * | 9/2005 | McCaslin et al. | 360/75 |
| 7,006,333 B1 * | 2/2006 | Summers | 360/294.4 |

(Continued)

*Primary Examiner* — Brian Miller

(57) ABSTRACT

A region of flexure layer, including slider mounting face coupled to offset mounting face for at least one piezoelectric device. The offset mounting face for piezoelectric device provides asymmetry between first contact region and second contact region based upon notch and slot. This is cost effective, reliable support for piezoelectric devices used for microactuation in hard disk drives. The slider moves based upon asymmetry of the offset mounting face coupled to the piezoelectric device twisting the slider mounting face. The invention includes flexure containing the region of the flexure layer. The invention includes head gimbal assembly including flexure, actuator arm including head gimbal assembly, and actuator assembly including actuator arm, and hard disk drive including actuator assembly. The invention includes manufacturing the region, the flexure, the head gimbal assembly, the actuator arm, the actuator assembly and the hard disk drive, as well as these products of the manufacturing processes.

31 Claims, 15 Drawing Sheets

U.S. PATENT DOCUMENTS

| | | |
|---|---|---|
| 7,130,160 B2 | 10/2006 | Kwon et al. |
| 2003/0202290 A1* | 10/2003 | Pan et al. .................... 360/294.4 |
| 2003/0202292 A1* | 10/2003 | Arya et al. ................. 360/294.4 |
| 2004/0125510 A1* | 7/2004 | Yang et al. ................. 360/294.4 |
| 2005/0105217 A1 | 5/2005 | Kwon et al. |
| 2007/0236102 A1* | 10/2007 | Hida et al. .................... 310/328 |

* cited by examiner

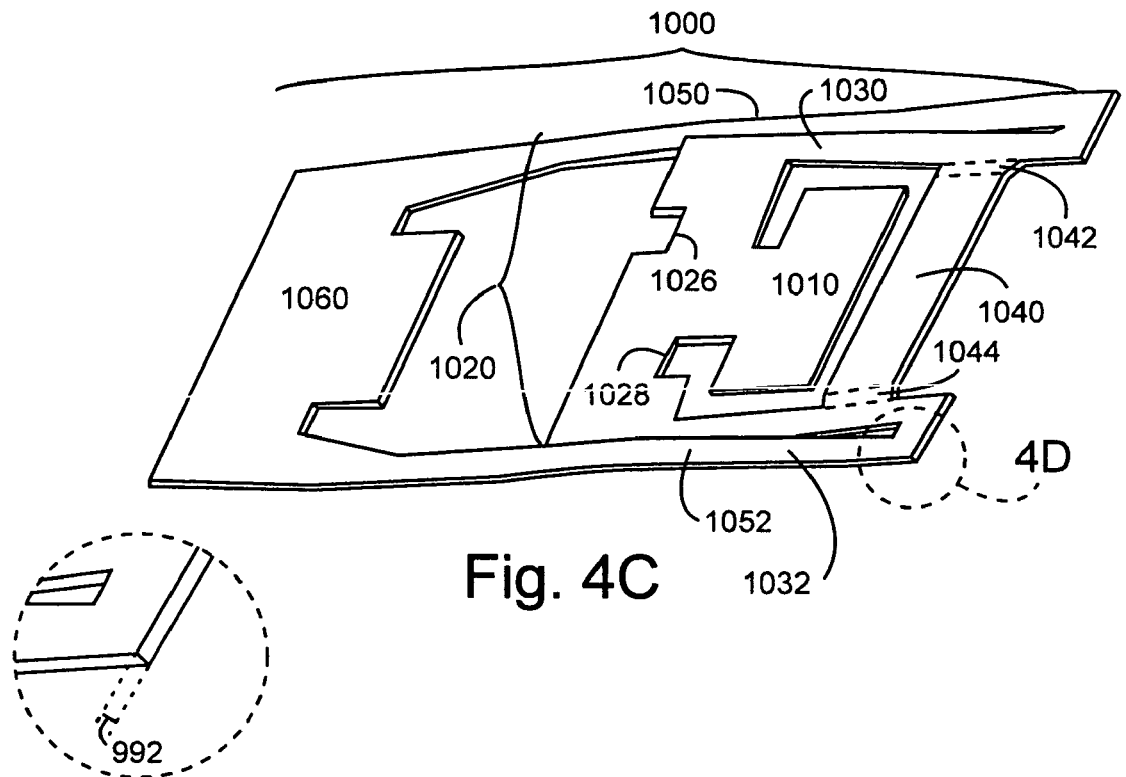
Fig. 4C
Fig. 4D
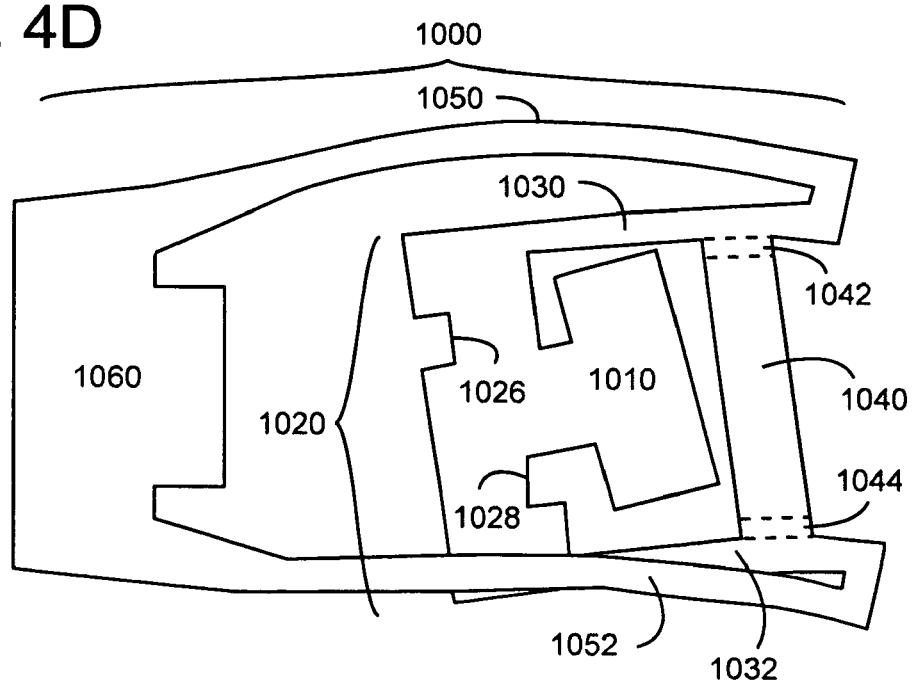
Fig. 4E

METHOD AND APPARATUS COUPLING TO A SLIDER IN A HARD DISK DRIVE FOR MICROACTUATION

CROSS REFERENCE TO RELATED APPLICATIONS

This application is a continuation in part of application Ser. No. 11/017,540 filed Dec. 15, 2004 (which further claims the benefit of the priority date of provisional patent application Ser. No. 60/530,712 filed Dec. 18, 2003), application Ser. No. 10/713,616 filed Nov. 13, 2003 now abandoned, application Ser. No. 10/903,730 filed Jul. 29, 2004 now U.S. Pat. No. 7,336,436, and application Ser. No. 10/757,238 filed Jan. 13, 2004 now U.S. Pat. No. 7,130,160. All of the applications set forth above are incorporated herein by reference.

TECHNICAL FIELD

The invention relates to the coupling of the slider with at least one piezoelectric device for positioning the slider over a rotating disk surface within a hard disk drive.

BACKGROUND OF THE INVENTION

Hard disk drives include a servo-controller driving a voice coil actuator to position a read-write head near a track on a rotating disk surface. The read-write head communicates with the servo-controller, providing feedback used to control the read-write head's positioning near the track. The read-write head is embedded in a slider and floats on a thin air bearing formed above the rotating disk surface.

The voice coil actuator traditionally positioned the slider and its read-write head over the rotating disk surface. The voice coil actuator typically includes a voice coil, that swings at least one actuator arm in response to the servo-controller. Each actuator arm includes at least one head gimbal assembly typically containing a read-write head embedded in a slider. The head gimbal assembly couples to the actuator arm in the voice coil actuator.

A hard disk drive may have one or more disks. Each of the disks may have up to two disk surfaces in use. Each disk surface in use has an associated slider, with the necessary actuator arm. Hard disk drives typically have only one voice coil actuator.

Today, the bandwidth of the servo-controller feedback loop, or servo bandwidth, is typically in the range of 1.1K Hz. Greater servo bandwidth increases the sensitivity of the servo-controller to drive the voice coil actuator to finer track positioning. Additionally, it decreases the time for the voice coil actuator to change track positions. However, increasing servo bandwidth is difficult, and has not significantly improved in years. As areal densities increase, the need to improve track positioning increases.

One answer to this need involves integrating a micro-actuator into each head gimbal assembly. These micro-actuators are devices typically built of piezoelectric composite materials, often including lead, zirconium, and tungsten. The piezoelectric effect generates a mechanical action through the application of electric power. The piezoelectric effect of the micro-actuator, acting through a lever between the slider and the actuator arm, moves the read-write head over the tracks of a rotating disk surface.

The micro-actuator is typically controlled by the servo-controller through one or two wires. Electrically stimulating the micro-actuator through the wires triggers mechanical motion due to the piezoelectric effect. The micro-actuator adds fine positioning capabilities to the voice coil actuator, that effectively extends the servo bandwidth. In the single wire approach, the servo-controller provides a DC (direct current) voltage to one of the two leads of the piezoelectric element. The other lead is tied to a shared ground. In the two wire approach, the servo-controller drives both leads of the piezoelectric element of the micro-actuator.

Micro-actuation is today in its industrial infancy. What is needed is a practical, reliable and cost effective mechanism coupling a slider to a piezoelectric device to form a micro-actuator for use in hard disk drives.

BRIEF SUMMARY OF THE INVENTION

The invention includes a region of a flexure layer. The region of the flexure layer may include a slider mounting face coupled to an offset mounting face for at least one piezoelectric device. The offset mounting face for the piezoelectric device provides an asymmetry between a first contact region and a second contact region. Some offset mounting faces provide the asymmetry by using a notch and a slot, which simulations indicate may be preferred in certain situations. The flexure layer is primarily composed of a stiff material. The invention further includes a flexure containing the region of the flexure layer, as well as arms coupling the region to the flexure both mechanically and electrically.

The invention provides a cost effective, reliable region supporting piezoelectric devices that may be used for micro-actuation in hard disk drives. The region couples to a slider by the slider mounting face, and couples to the piezoelectric device by the offset mounting face. The piezoelectric device preferably couples to the offset mounting face by coupling with the first contact region and the second contact region. When the piezoelectric device contracts, the slider is moved in a first direction. When the piezoelectric device expands, the slider is moved in a second direction. The piezoelectric device contracts when stimulated by a first potential difference. The piezoelectric device expands when stimulated by a second potential difference. The slider is moved based upon the asymmetry of the offset mounting face coupled to the piezoelectric device, that twists the slider mounting face.

The invention also comprises a head gimbal assembly including the flexure, an actuator arm including the head gimbal assembly, an actuator assembly including the actuator arm, and a hard disk drive including the actuator assembly. The invention includes manufacturing methods for the region, the flexure, the head gimbal assembly, the actuator arm, the actuator assembly and the hard disk drive, as well as these products of the manufacturing processes.

BRIEF DESCRIPTION OF THE DRAWINGS

FIG. 4C shows the overall mechanical condition of the region near the second dent, at about 21 KHz;

FIG. 4D shows an enlarged view of a portion of FIG. 4C showing the thickness of the flexure layer;

FIG. 4E shows the overall mechanical condition of the region near the third dent, at about 40 KHz;

DETAILED DESCRIPTION

The invention includes a region of a flexure layer, including the following. A slider mounting face coupled to an offset mounting face for at least one piezoelectric device. The offset mounting face for the piezoelectric device provides an asymmetry between a first contact region and a second contact region. Some offset mounting faces provide the asymmetry by using a not and a slot, while others use two notches. This invention will focus on the use of the notch and slot approach to providing asymmetry in the offset mounting the face.

The flexure layer is primarily composed of a stiff material. The stiff material is preferably a form of stainless steel. Alternatively, the stiff material may have comparable or greater stiffness than stainless steel. The stiff material may be primarily composed of a metallic alloy. The metallic alloy may include iron, titanium and/or platinum. Alternatively, the stiff material may include a form of at least one hydrocarbon. A hydrocarbon may include at least one carbon atom and at least one hydrogen atom in a molecular bonding arrangement. The molecular bonding arrangement may implement a lattice of nano-tubes.

The invention provides a cost effective, reliable region supporting piezoelectric devices being used for micro-actuation in hard disk drives. The region couples to a slider by the slider mounting face, and couples to the piezoelectric device by the offset mounting face. The piezoelectric device preferably couples to the offset mounting face by coupling with the first contact region and the second contact region. When the piezoelectric device contracts, the slider is moved in a first direction. When the piezoelectric device expands, the slider is moved in a second direction. The piezoelectric device contracts when stimulated by a first potential difference. The piezoelectric device expands when stimulated by a second potential difference. The slider is moved based upon the asymmetry of the offset mounting face coupled to the piezoelectric device, that twists the slider mounting face.

Figure 1A:
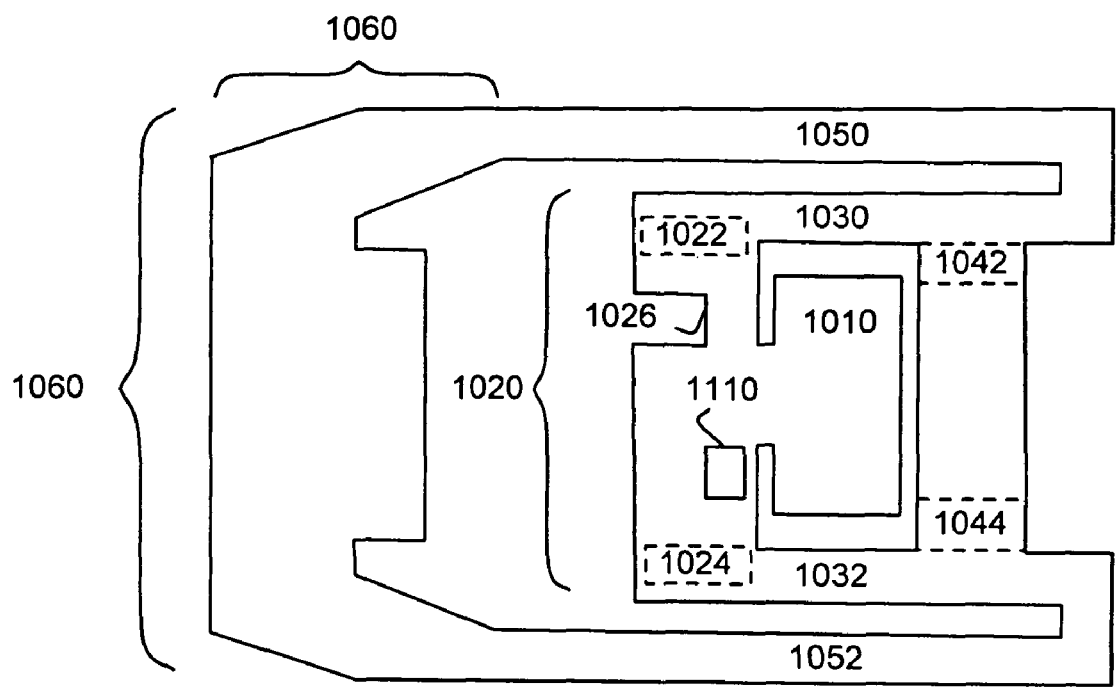
FIGS. 1A and 1B show a top view of an improved region of a flexure layer, with an offset mounting face including a notch and a slot, used in apparatus implementing the operations of the invention.
Figure 1B:
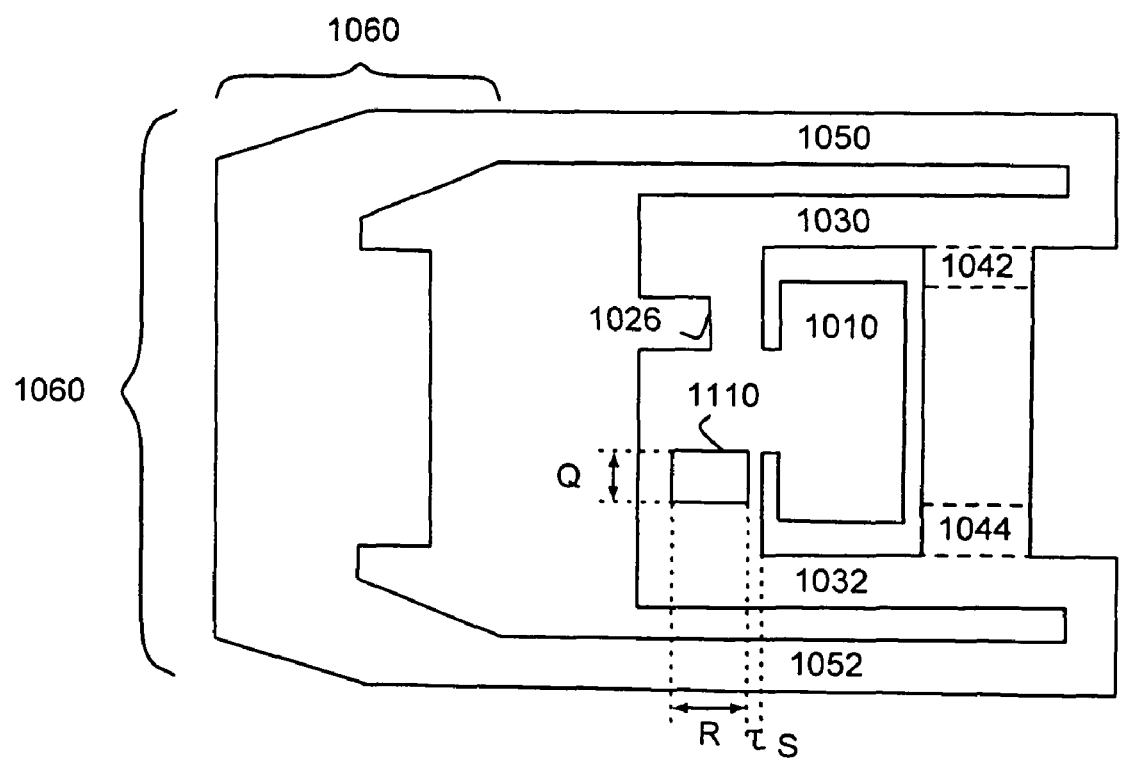
Figure 2A:
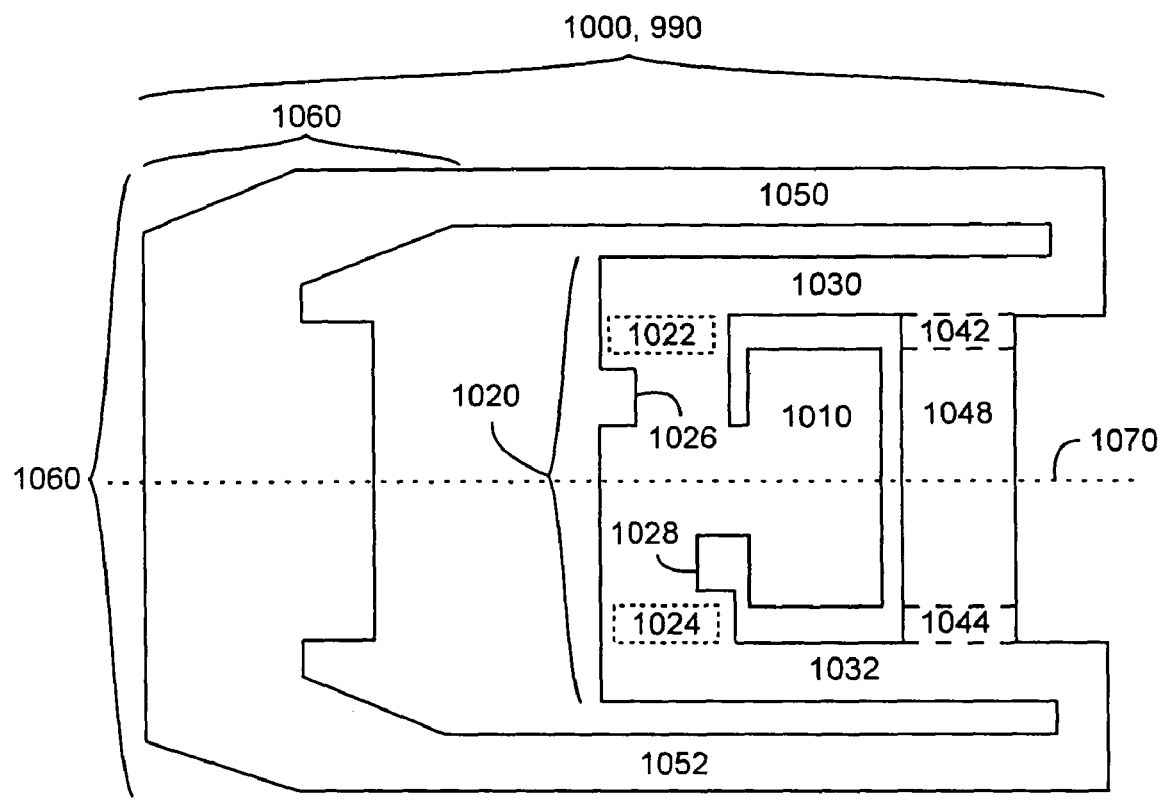
FIG. 2A shows a top view of a region of a flexure layer, with an offset mounting face including two notches, used in apparatus implementing the operations of the invention.
Figure 2B:
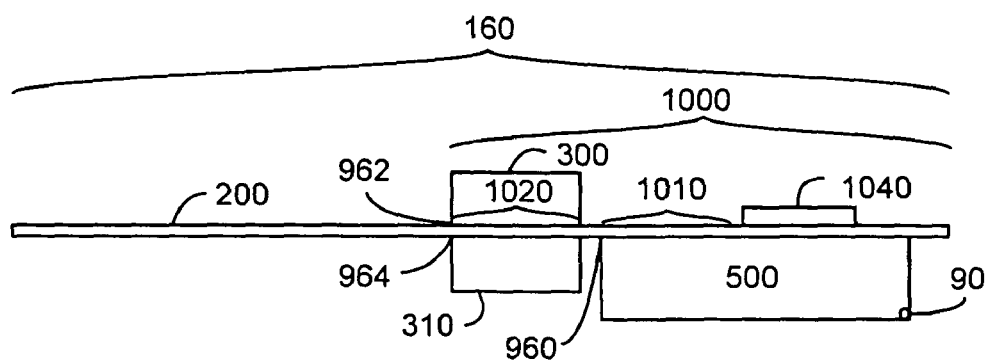
FIG. 2B shows a side view of a head gimbal assembly including the flexure layer, with the region of FIG. 2A coupled with the piezoelectric device, a second piezoelectric device and a slider.
Figure 2C:
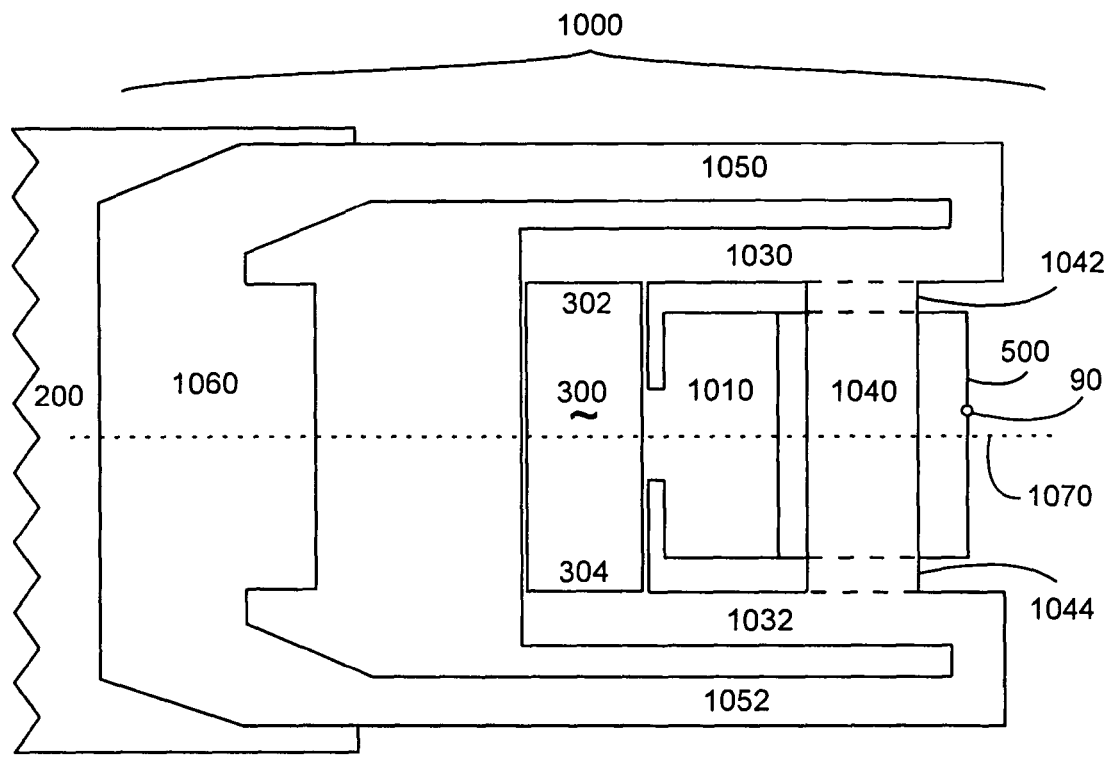
FIG. 2C shows a side view of part of the flexure layer, with the region coupled with the slider and the piezoelectric device shown in FIG. 2B.
Figure 2D:
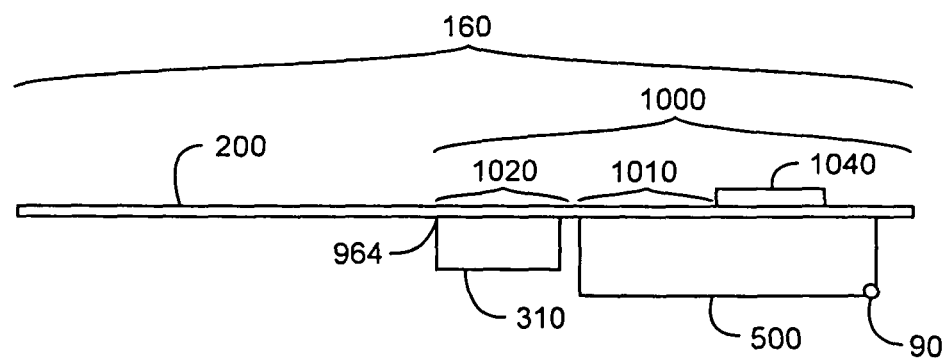
FIG. 2D shows an alternative version of FIG. 2B, including the flexure layer, the region coupled with the second piezoelectric device and the slider.
Figure 2E:
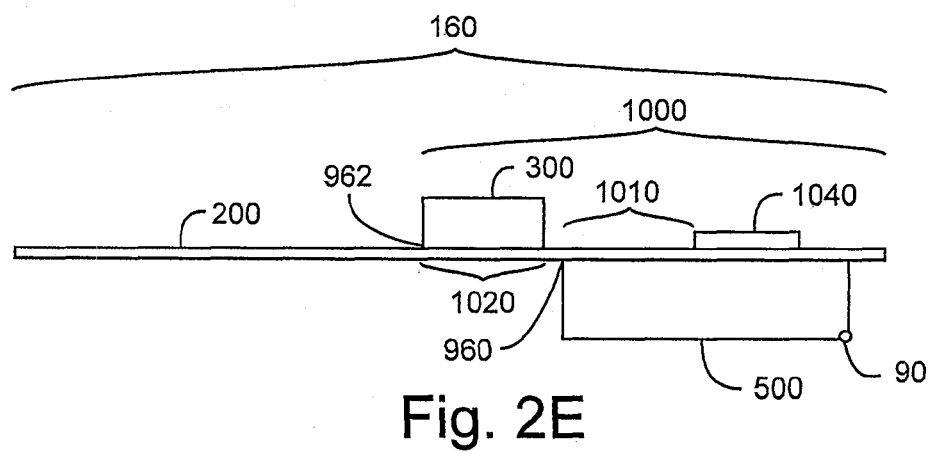
FIG. 2E shows an alternative version of FIG. 2B, including the flexure layer, the region coupled with the piezoelectric device and the slider.

FIGS. 1A, 1B and 2A shows a top view of a region 1000 of the flexure layer 990 used in apparatus implementing the present invention. The region 1000 includes the following. A slider mounting face 1010 coupled to an offset mounting face 1020 for at least one piezoelectric device 300, as shown in FIGS. 2B, 2C, and 2E. The offset mounting face 1020 for the piezoelectric device 300 provides an asymmetry between a first contact region 1022 and a second contact region 1024. The flexure layer 990 is primarily composed of a stiff material. The offset mounting face 1020 in FIGS. 1A and 1B uses a first notch 1026 and a notch 1110 to provide the asymmetry. The offset mounting face in FIG. 2A uses the first notch 1026 and a second notch 1028 to provide the asymmetry.

In simulation, five embodiments of the invention's region 1000 were used in a head gimbal assembly 160 as shown in FIG. 2B. Two include the offset mounting face 1020 of FIG. 2A, referenced as Designs 1 and 2. Designs 3 to 5 include the offset mount face of FIGS. 1A and 1B. These embodiments use design parameters shown in FIGS. 2F and 1B (for Q, R, and S) with values in micro-meters (µm) and summarized in Table One:

| Parameter | Design 1 | Design 2 | Design 3 | Design 4 | Design 5 |
| --- | --- | --- | --- | --- | --- |
| A | 50 | 50 | 50 | 50 | 50 |
| B | 150 | 150 | 150 | 150 | 150 |
| C | 150 | 150 | 150 | 150 | 150 |
| D | 150 | 150 | 150 | 150 | 150 |
| E | 150 | 150 | 150 | 150 | 150 |
| F | 100 | 100 | 100 | 100 | 100 |
| G | 700 | 700 | 700 | 700 | 700 |
| H | 350 | 350 | 350 | 350 | 350 |
| I | 800 | 800 | 800 | 800 | 800 |
| J | 1350 | 1350 | 1350 | 1350 | 1350 |
| K | 100 | 100 | 100 | 100 | 100 |
| L | 400 | 400 | 400 | 400 | 400 |
| M | 150 | 300 | 350 | 350 | 350 |
| N | 150 | 150 | | | |
| P | 100 | 100 | | | |
| Q | | | 250 | 250 | 250 |
| R | | | 150 | 350 | 500 |
| S | | | 40 | 40 | 40 |

Figure 1C:
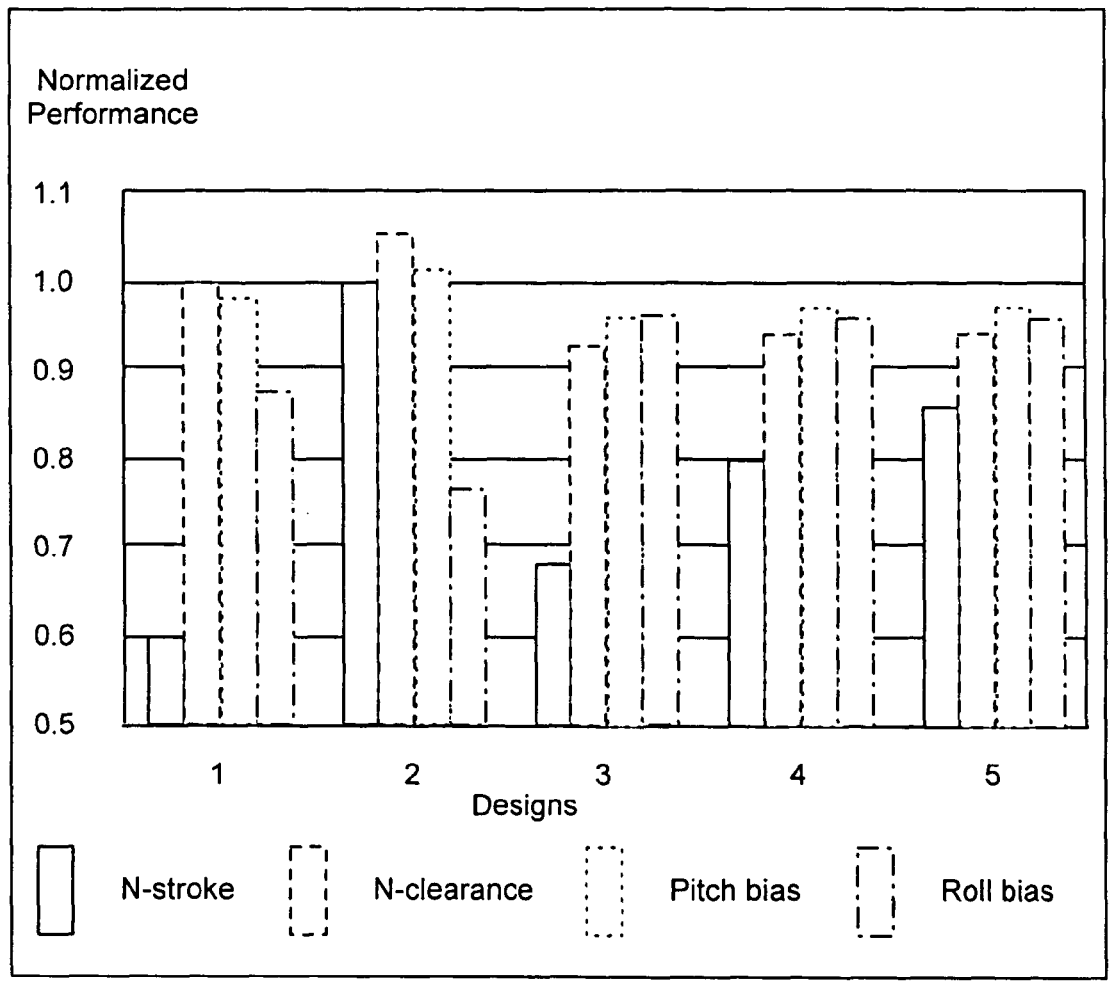
FIG. 1C shows a comparison of simulation results for five embodiments of the invention.

Table One showing the design parameters of the region 1000 for the designs compared in simulations summarized in FIG. 1C.

Figure 9A:
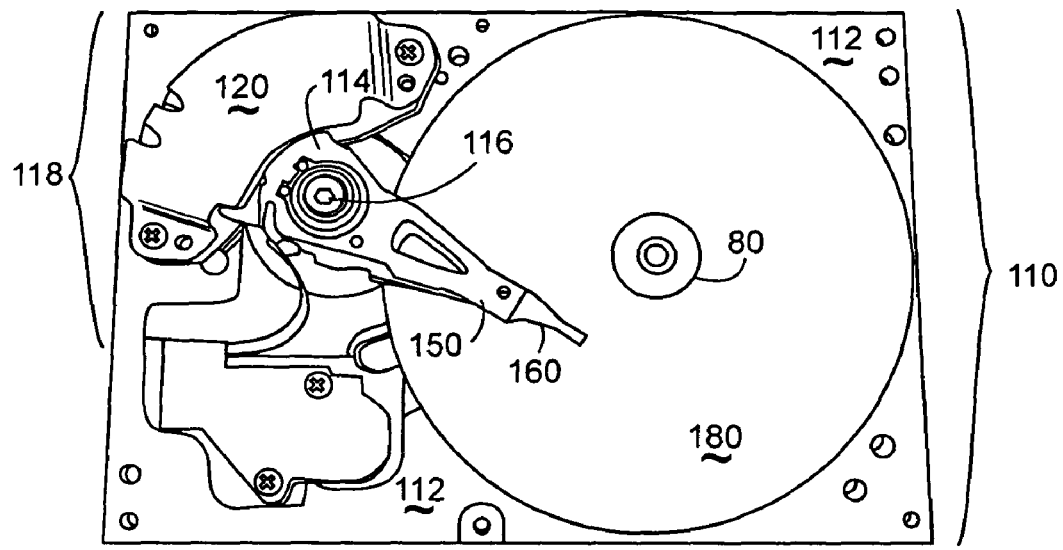
FIGS. 9A and 9B show the hard disk drive of FIG. 8 with the slider moving over a rotating disk surface, being positioned by the piezoelectric device through the invention's region in accord with the operations discussed for FIGS. 3A and 3B.
Figure 9B:
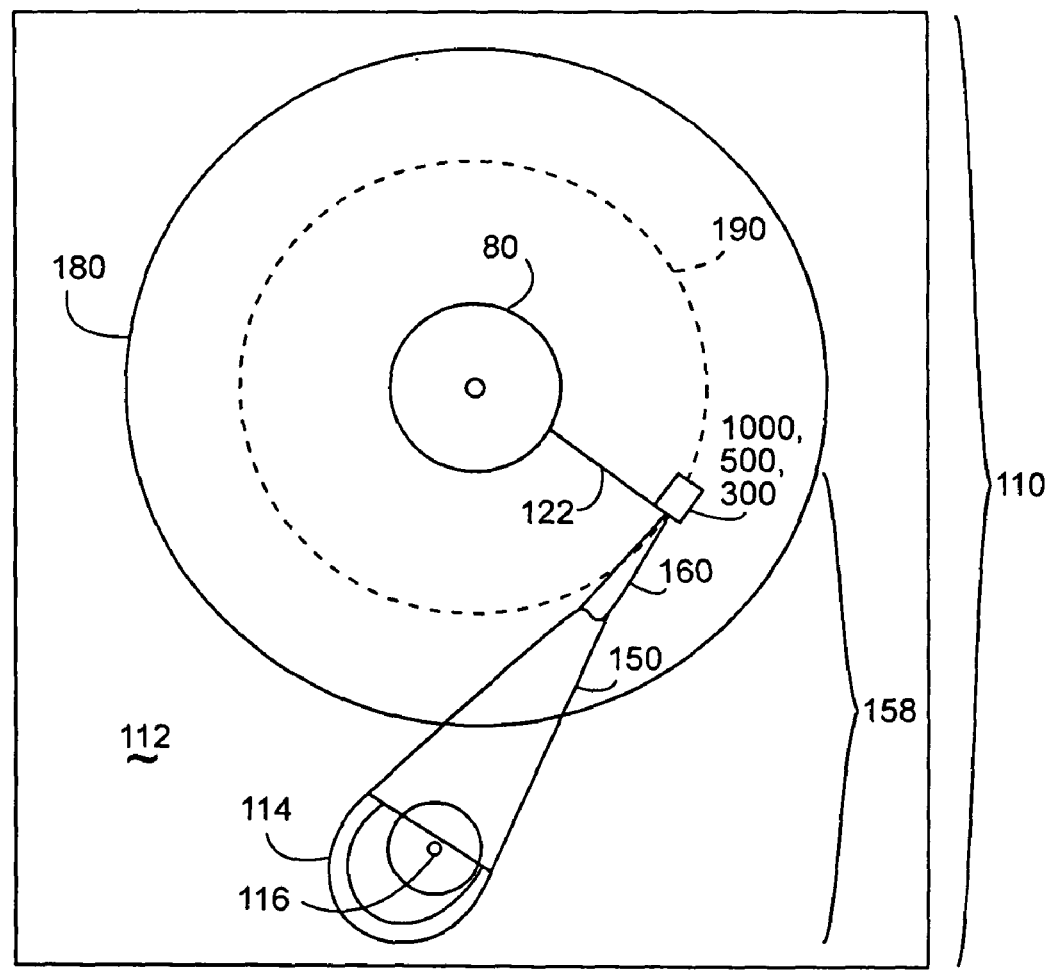
Figure 10:
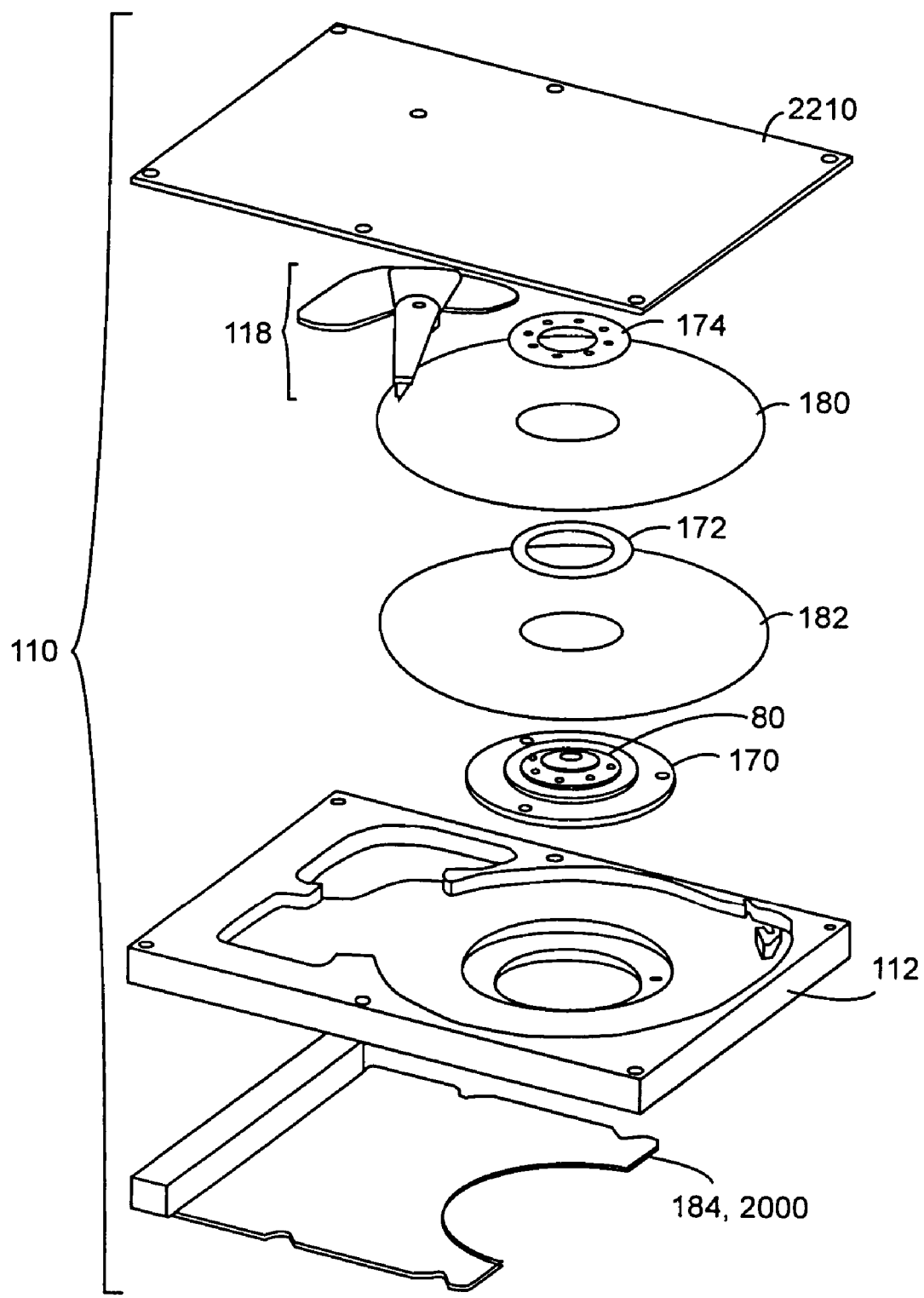
FIG. 10 shows an exploded view of the primary components of the hard disk drive of FIGS. 8 to 9B.
Figure 11:
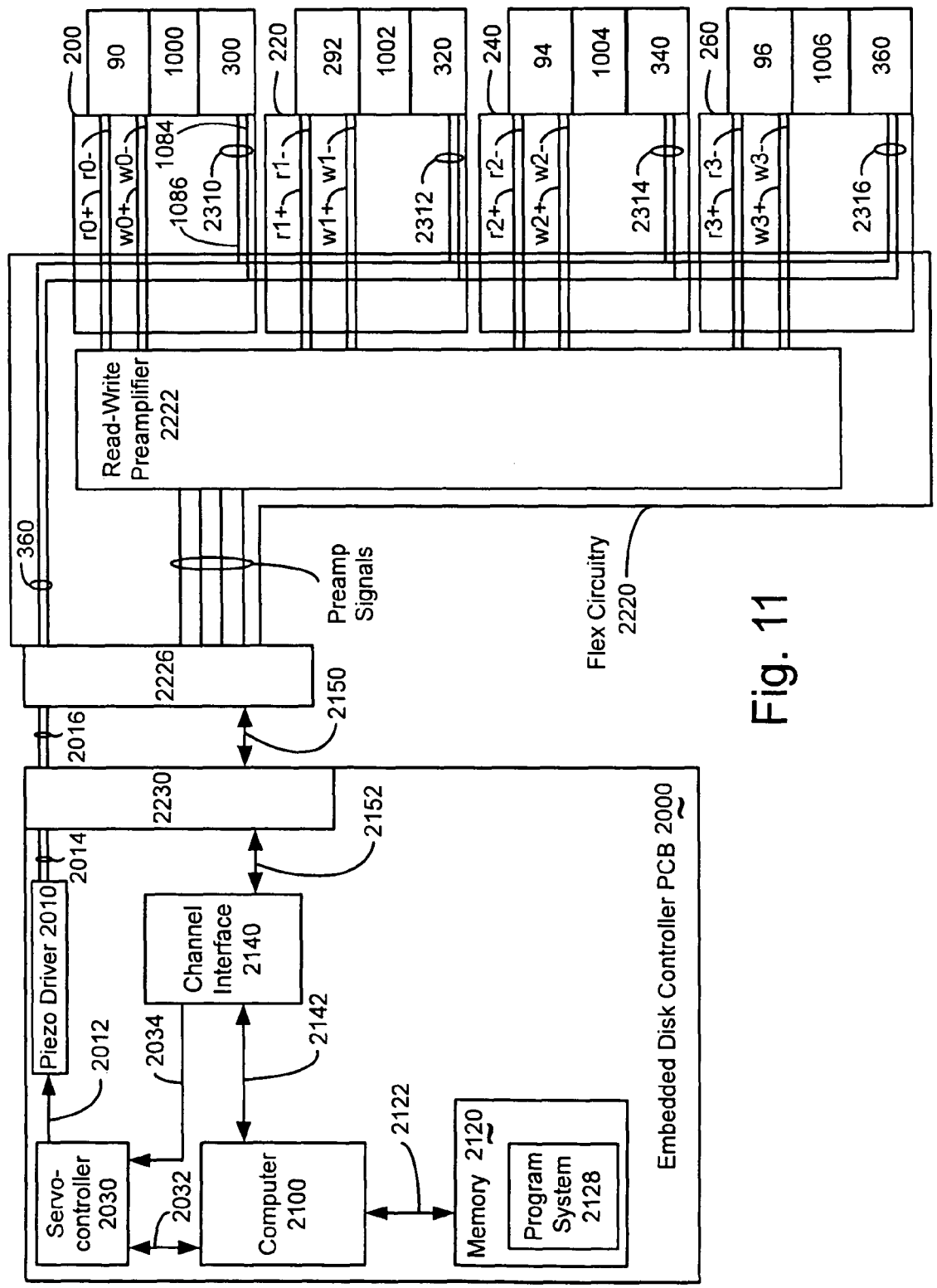
FIG. 11 shows a schematic view of the electrical interconnection of the read-write head, the piezoelectric device, for at least one head gimbal assembly of FIGS. 2B, 2D, 2E, and 8 to 20.

FIG. 1C shows a bar chart with its vertical axis labeled "Normalized performance" and horizontal axis labeled "Designs". There are five clusters of boxes, each cluster summarizing the simulated performance for a specific design, as parameterized in Table One above. The first performance parameter is labeled "N-stroke" and represents the stroke length of the read-write hard 90 parallel to the rotating disk surface 180 as shown in FIGS. 9A and 9B. The second performance parameter is labeled "N-clearance" and represents the stroke clearance. The third parameter is labeled "pitch bias". The fourth parameter is labeled "roll bias".

Designs 1 and 2 are weak in roll bias, which can adversely affects the ability of the read-write head 90 to traverse vibrations in the rotating disk surface 180. Designs 3, 4 and 5 are all strong in terms of roll bias. Design 1 is also weak in stroke length, as is Design 3 and 4. Design 5 is the strongest overall performer in these simulations, which indicates embodiments of the invention with the offset mounting face 1020 including the first notch 1026 and the slot 1110, as shown in FIGS. 1A and 1B, may be preferred.

A side view of a head gimbal assembly 160 including the flexure cable 200, the region 1000 coupled with the piezoelectric device 300, a second piezoelectric device 310 and a slider 500 is shown in FIG. 2B. The slider 500 includes the read-write head 90, that is typically preferred to be a merged read-write magnetoresistive head.

FIG. 2C shows a side view of part of the flexure cable 200, the region 1000 coupled with the slider 500 and the piezoelectric device 300 shown in FIG. 2B. FIG. 2D shows an alternative version of FIG. 2B, including the flexure cable 200, the region 1000 coupled with the second piezoelectric device 310 and the slider 500. FIG. 2E shows an alternative version of FIG. 2B, including the flexure cable 200, the region 1000 coupled with the piezoelectric device 300 and the slider 500.

In FIGS. 2B, 2D, and 2E, the slider bridge 1040 is shown with an offset above most of the region 1000 and above the slider 500. In FIGS. 2B to 2E, the head gimbal assembly 160 includes the flexure cable 200 mechanically coupling the piezoelectric device 300 to the offset mounting face 1020. The head gimbal assembly 160 also includes the flexure cable 200 mechanically coupling the slider 500 to the slider mounting face 1010.

In FIGS. 2A and 1C, a first arm 1030 couples the offset mounting face 1020 to a first mount 1042 of the slider bridge 1040. A second arm 1032 couples the offset mounting face 1020 to a second mount 1044 of the slider bridge 1040. A first outer arm 1050 couples to the first mount 1042 of the slider bridge 1040 and traverses essentially in parallel to the first arm 1030 to a flexure tab 1060. A second outer arm 1052 couples to the second mount 1044 of the slider bridge 1040 and traverses essentially in parallel to the second arm 1032 to the flexure tab 1060.

In FIGS. 2A and 1C, the asymmetry provided by the offset mounting face 1020 is shown with respect to the central rest axis 1070. The central rest axis 1070 passes through the center of the region 1000, as well as the piezoelectric device 300. The offset mounting face 1020 includes a first notch 1026 and a second notch 1028 providing the asymmetry about the central rest axis 1070.

The stiff material of the flexure layer 990 of FIGS. 2A and 2C is preferably a form of stainless steel. Alternatively, the stiff material may have comparable or greater stiffness than stainless steel. The stiff material may be primarily composed of a metallic alloy. The metallic alloy may include iron, titanium, and/or platinum. Alternatively, the stiff material may include a form of at least one hydrocarbon. A hydrocarbon may include at least one carbon atom and at least one hydrogen atom in a molecular bonding arrangement. The molecular bonding arrangement may implement a lattice of nano-tubes.

The slider 500 is coupled to the slider mounting face 1010 by the second mechanical coupling 960 as shown in FIGS. 2B, 2D and 2E. The piezoelectric device 300 is coupled to the offset mounting face 1020 by a first mechanical coupling 962 as shown in FIGS. 2B and 2E. The second piezoelectric device 310 is coupled to the offset mounting face 1020 by a third mechanical coupling 964 as shown in FIGS. 2B and 2D.

Figure 6:
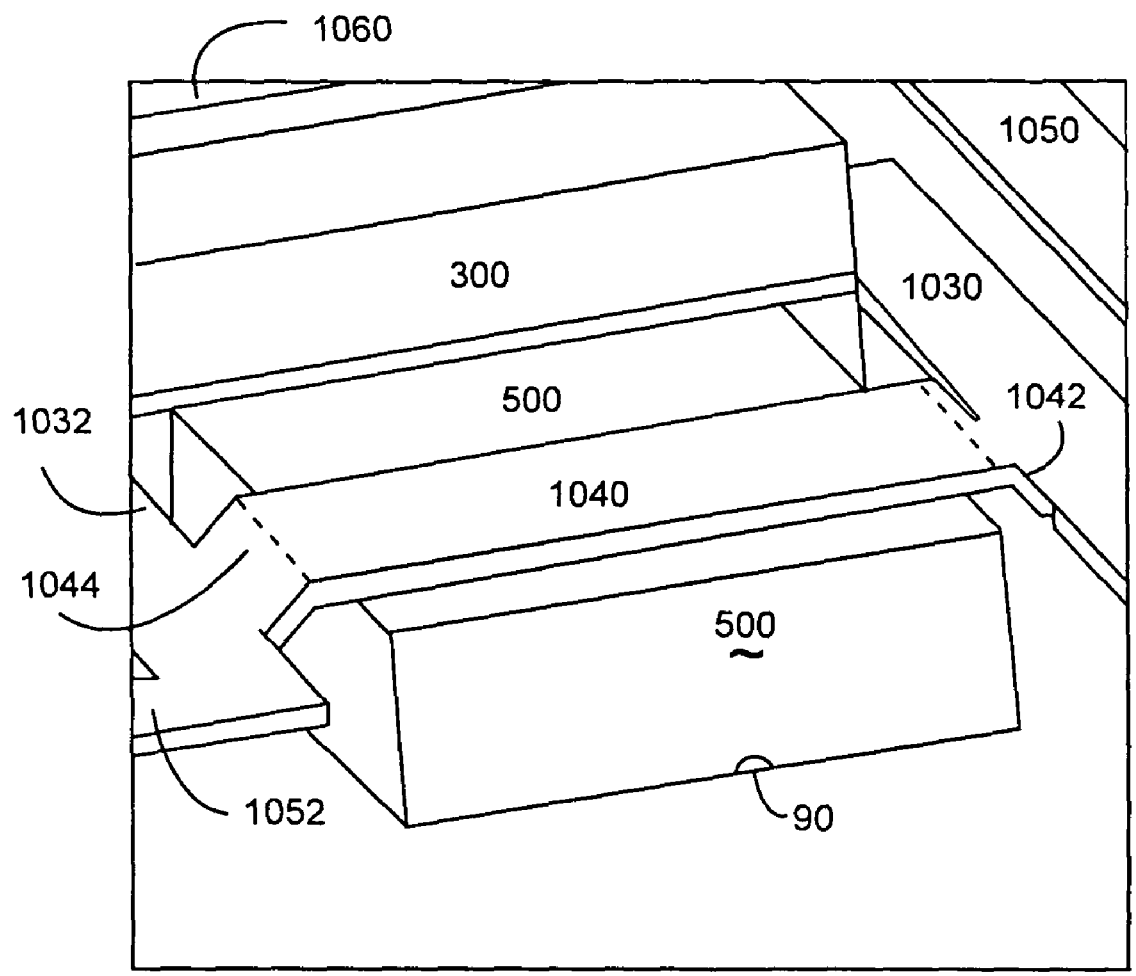
FIG. 6 shows a perspective view of part of the region of FIGS. 2B and 2C coupled to the slider and at least one piezoelectric device.

FIG. 6 shows a perspective view of part of the region 1000 of FIGS. 2B and 2C coupled to the slider 500 and at least one piezoelectric device 300.

FIG. 2F shows some preferred dimensions for components included in the region 1000 of FIG. 2A. Reference A is preferably about 50 micro-meters to within ten percent. Reference B is preferably about 150 micro-meters to within ten percent. Reference C is preferably about 150 micro-meters to within ten percent. Reference D is preferably about 150 micro-meters to within ten percent. Reference E is preferably about 150 micro-meters to within ten percent. Reference F is preferably about 100 micro-meters to within ten percent. Reference G is preferably about 700 micro-meters to within ten percent. Reference H is preferably about 350 micro-meters to within ten percent. Reference I is preferably about 800 micro-meters to within ten percent. Reference J is preferably about 1350 micro-meters to within ten percent. Reference K is preferably about 100 micro-meters to within ten percent. Reference L is preferably about 400 micro-meters to within ten percent. Reference M is preferably about 50 micro-meters to within ten percent. Reference N is preferably about 100 micro-meters to within ten percent.

Figure 3A:
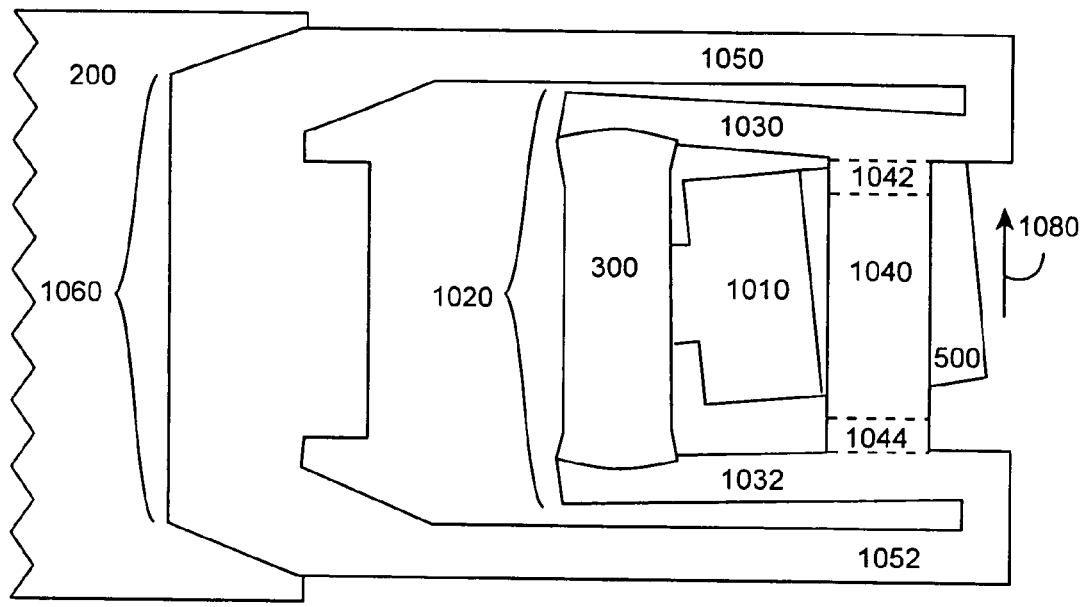
FIGS. 3A and 3B show the method of moving the slider in accord with the invention.
Figure 3B:
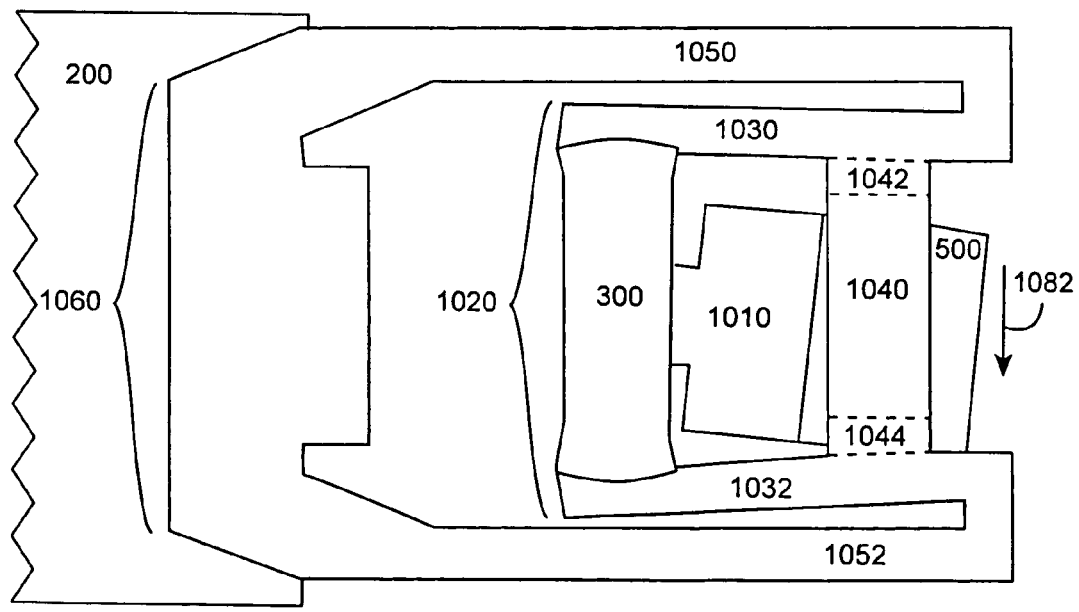

FIGS. 3A and 3B show the method of moving the slider 500 in accord with the invention. FIG. 3A shows the effect of applying a first potential difference to electrically stimulate the piezoelectric device 300 to contract, applying a first asymmetric force across the offset mounting face 1020 to move the slider 500 in a first direction 1080. The alternative embodiments using the piezoelectric device 300 and/or the second piezoelectric device 310, shown in FIGS. 2B, 2D and 2E, are applicable to FIG. 3A. Such embodiments may be preferred in various situations.

In FIG. 3A, the operation of applying the first potential difference may preferably be implemented as follows: the first potential difference is applied to electrically stimulate the piezoelectric device 300 to contract. The piezoelectric device 300 contracts, applying the first asymmetric force across the offset mounting face 1020. The offset mounting face 1020 twists under the first asymmetric force to move a slider mounting face 1010 in the first direction 1080. The slider 500 moves through the second mechanical coupling 960 to the slider mounting face 1010 in the first direction 1080.

FIG. 3B shows applying a second potential difference to electrically stimulate the piezoelectric device 300 to expand, applying a second asymmetric force across the offset mounting face 1020 to move the slider 500 in a second direction 1082. Alternative embodiments using the piezoelectric device 300 and/or the second piezoelectric device 310, shown in FIGS. 2B, 2D and 2E, are applicable to FIG. 3A. Such embodiments may be preferred in various situations.

In FIG. 3B, the operation of applying the second potential difference may preferably be implemented as follows: the second potential difference is applied to electrically stimulate the piezoelectric device 300 to expand. The piezoelectric device 300 expands, applying the second asymmetric force across the offset mounting face 1020. The offset mounting face 1020 twists under the second asymmetric force to move the slider mounting face 1010 in the second direction 1082.

The slider 500 moves through the second mechanical coupling 960 to the slider mounting face 1010 in the second direction 1082.

In FIGS. 3A and 3B, the head gimbal assembly 160 is shown used in a hard disk drive 110. A disk surface is rotated to create a rotating disk surface 180. The slider 500 moves in the first direction 1080 across the rotating disk surface 180 in FIG. 3A. The slider 500 moves in the second direction 1082 across the rotating disk surface 180 in FIG. 3B.

The invention includes making the flexure cable 200, that may preferably include the following steps. Imprinting the flexure layer 990 with a mask of the region 1000 on a raw flexure to create an imprinted flexure layer. Etching the imprinted flexure layer to form the region 1000 of the flexure layer 990 in the flexure cable 200. The making of the flexure cable 200 may further include selective bending of the region 1000 to create the slider bridge 1040 coupled by the first mount 1042 and by the second mount 1044. The invention further includes the flexure cable 200 as a product of the process of making it.

Figure 3C:
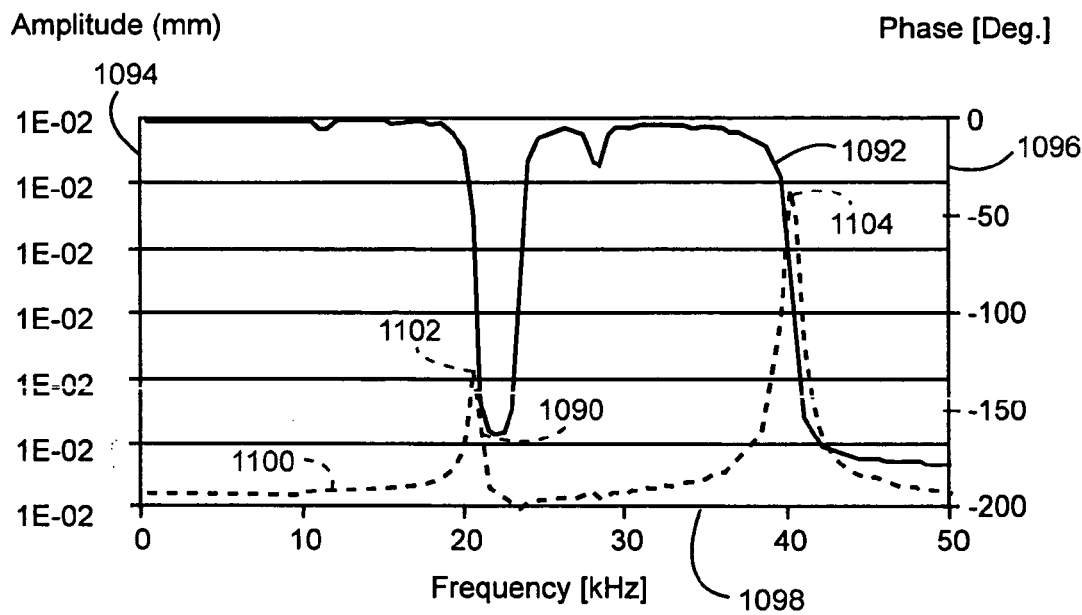
FIG. 3C shows the results of simulations of the frequency response of the apparatus of the invention to electrical excitation of the drive voltage in terms of mechanical vibration.

FIG. 3C shows the results of simulations of the frequency response of the apparatus of the invention to mechanical vibration. The assumed conditions of these simulation are expected to be very close the real mechanical device operating conditions. The left hand axis shows the amplitude axis 1094. The right hand axis shows the phase axis 1096. The horizontal axis shows the frequency axis 1098. The dashed trace represents the amplitude response 1090. The solid trace represents the phase response 1092. The first dent 1100 in the amplitude response 1090 occurs at about 12 KHz and is shown in further detail in FIG. 4A. The second dent 1102 in the amplitude response 1090 occurs at about 21 KHz and is shown in further detail in FIG. 4C. The third dent 1104 in the amplitude response 1090 occurs at about 40 KHz and is shown in further detail in FIG. 4E.

Figures 4A, 4B:
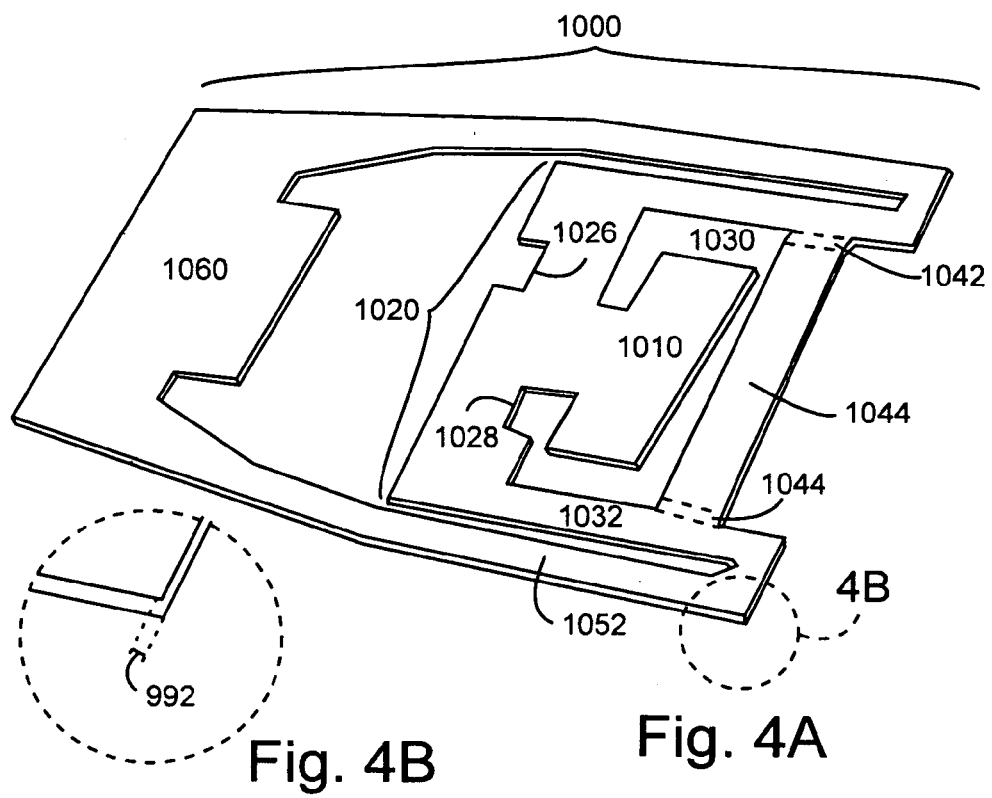
FIG. 4A shows the overall mechanical condition of the region near the first dent in the amplitude response of FIG. 3C, at about 12 KHz.
FIG. 4B shows an enlarged view of a portion of FIG. 4A showing the thickness of the flexure layer.

FIG. 4A shows the overall mechanical condition of the region 1000 near the first dent 1100 in the amplitude response 1090 of FIG. 3C, at about 12 KHz. The region 1000 shows negligible distortion of the first arm 1030, the first outer arm 1050, the offset mounting face 1020, the second arm 1032, and the second outer arm 1052. The first mount 1042 and the second mount 1044 are not significantly stressed.

FIG. 4C shows the overall mechanical condition of the region 1000 near the second dent 1102, at about 21 KHz. The region 1000 shows negligible distortion of the first outer arm 1050 and the second outer arm 1052. The region 1000 shows potentially significant distortion of the first arm 1030, the offset mounting face 1020, and the second arm 1032. The first mount 1042 and the second mount 1044 are somewhat stressed.

Figure 5A:
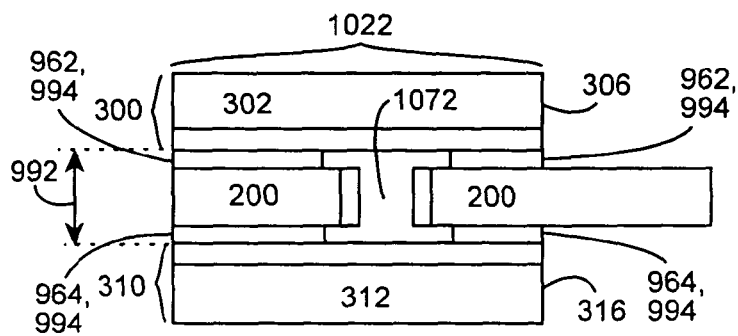
FIGS. 5A to 5E show a first scheme for electrically coupling to the piezoelectric device and/or the second piezoelectric device.
Figure 5B:
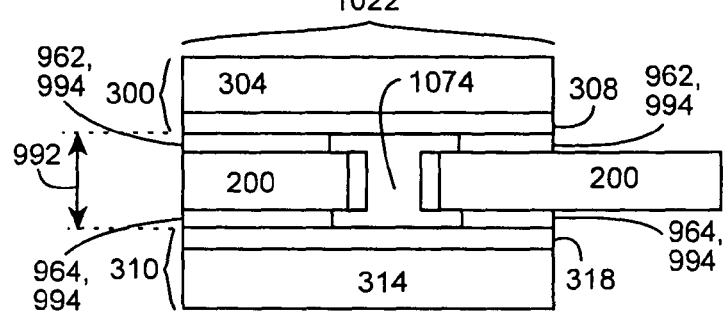

FIG. 4B shows an enlarged view of a portion of FIG. 4A showing the thickness 992 of the flexure layer 990 of FIGS. 2A and 2C. FIG. 4D shows an enlarged view of a portion of FIG. 4C showing the thickness 992 of the flexure layer 990. FIGS. 5A and 5B also show the thickness 992 of the flexure layer 990. The thickness 992 may preferably be at most fifty micro-meters. The thickness 992 may be preferred between ten micro-meters and forty micro-meters. The thickness 992 may further be preferred between twenty-five micro-meters and thirty five micro-meters. Alternatively, the thickness 992 may preferably be at most thirty micro-meters.

FIG. 4E shows the overall mechanical condition of the region 1000 near the third dent 1104, at about 40 KHz. The region 1000 shows significant distortion of the first arm 1030, the first outer arm 1050, the offset mounting face 1020, the second arm 1032, and the second outer arm 1052. The first mount 1042 and the second mount 1044 are significantly stressed. The stress potentially alters the relationship of the slider bridge 1040 with the slider mounting face 1010, and the slider 500 when coupled.

FIGS. 5A to 5E show a first scheme for electrically coupling to the piezoelectric device 300 and/or the second piezoelectric device 310. FIGS. 7A to 7D show a second scheme.

FIG. 5A shows a cross section view of the first mechanical coupling 962 of the piezoelectric device 300 and the third mechanical coupling 964 of the second piezoelectric device 310 to the first contact region 1022 included in the offset mounting face 1020 of FIGS. 2A, 2B, 2D, and 2E.

FIG. 5B shows a cross section view of the first mechanical coupling 962 of the piezoelectric device 300 and the third mechanical coupling 964 of the second piezoelectric device 310 to the second contact region 1024 included in the offset mounting face 1020 of FIGS. 2A, 2B, 2D, and 2E.

In FIG. 5A, the second piezoelectric device 310 includes a second first-end 312 similar to the first end 302 included in the piezoelectric device 300 shown in FIGS. 2C and 5A. The piezoelectric device 300 includes a first terminal 306. The second piezoelectric device 310 includes a second-first terminal 316. The first electrical coupling 1072 is connected to the first terminal 306 of the piezoelectric device 300, forming the first connection. The first connection may further include the first electrical coupling 1072 is connected to the second-first terminal 316 of the second piezoelectric device 310.

In FIG. 5B, the second piezoelectric device 310 includes a second-second end 314 similar to the second end 304 included in the piezoelectric device 300 shown in FIGS. 2C and 5B. The piezoelectric device 300 includes a second terminal 308. The second piezoelectric device 310 includes a second-second terminal 318. The second electrical coupling 1074 is connected to the second terminal 308 of the piezoelectric device 300, forming the second connection. The second connection may further include the second electrical coupling 1074 connected to the second-second terminal 318 of the second piezoelectric device 310.

Figure 5C:
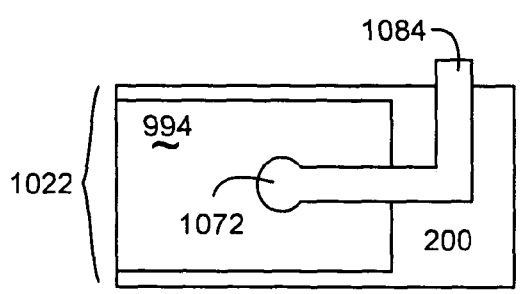

FIG. 5C shows the top view of the first contact region 1022 of FIG. 5A with the piezoelectric device 300 removed. A first conductive trace 1084, that traverses the first outer arm 1050 and the first arm 1030, to conductively couple to the first electrical coupling 1072. The second contact region 1024 of FIG. 5B is not shown with the piezoelectric device 300 removed, but may be understood through examining FIG. 5C, so that the second electrical coupling 1074 is conductively coupled by the second conductive trace 1086 shown in FIG. 21.

Figure 5D:
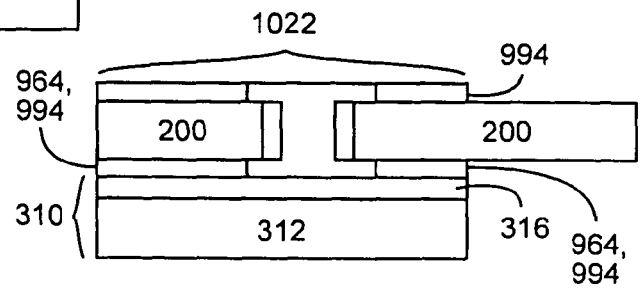

FIG. 5D shows a cross section view of the third mechanical coupling 964 of the second piezoelectric device 310 to the first contact region 1022 included in the offset mounting face 1020 of FIG. 2D. As in FIG. 5A, the second piezoelectric device 310 includes a second first-end 312. The second piezoelectric device 310 includes a second-first terminal 316. The first connection includes the first electrical coupling 1072 connected to the second-first terminal 316 of the second piezoelectric device 310.

Figure 5E:
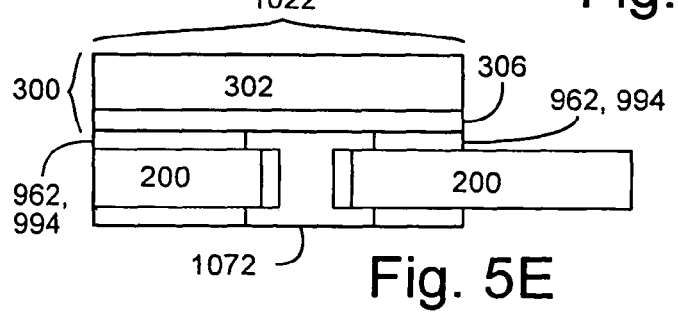

FIG. 5E shows a cross section view of the first mechanical coupling 962 of the piezoelectric device 300 to the first contact region 1022 included in the offset mounting face 1020 of FIG. 2E. The first electrical coupling 1072 is connected to the first terminal 306 of the piezoelectric device 300, forming the first connection.

In FIGS. 5A to 5E, the first mechanical coupling 962 may preferably involve the use of an adhesive 994. The third mechanical coupling 964 may preferably involve the use of the adhesive 994. The first electrical coupling 1072 may preferably be implemented as a plated through hole in the flexure cable 200. The second electrical coupling 1074 may preferably be implemented as a second plated through hole in the flexure cable 200.

Figure 7A:
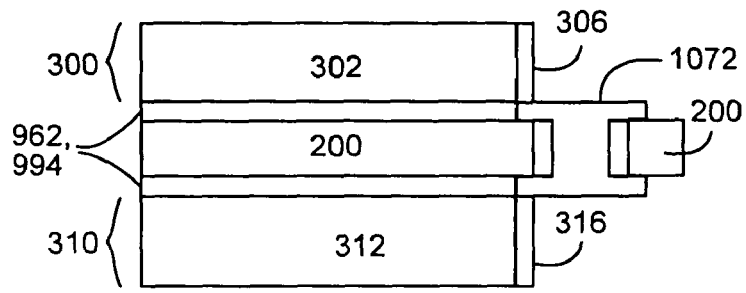
FIGS. 7A to 7D show a second scheme for electrically coupling to the piezoelectric device and/or the second piezoelectric device.
Figure 7B:
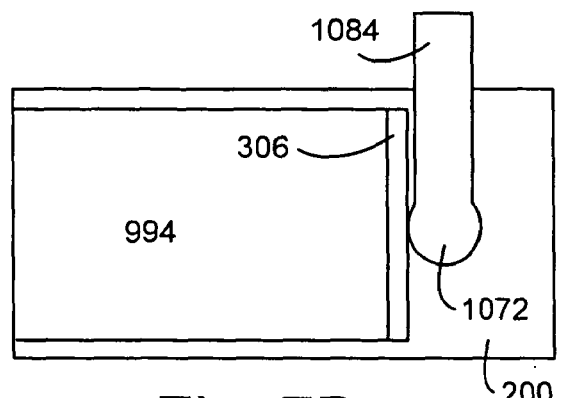
Figure 7C:
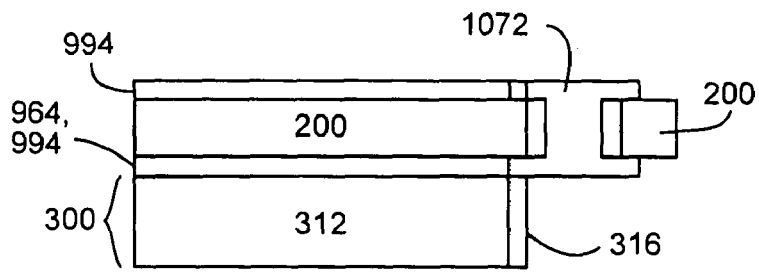
Figure 7D:
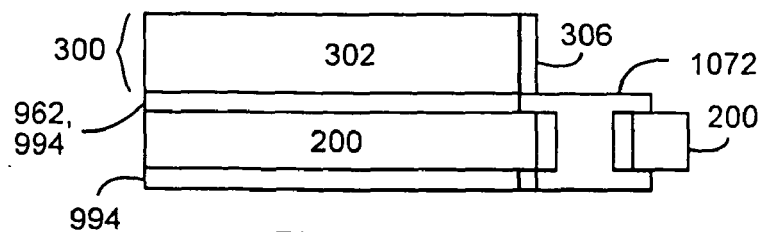
Figure 8:
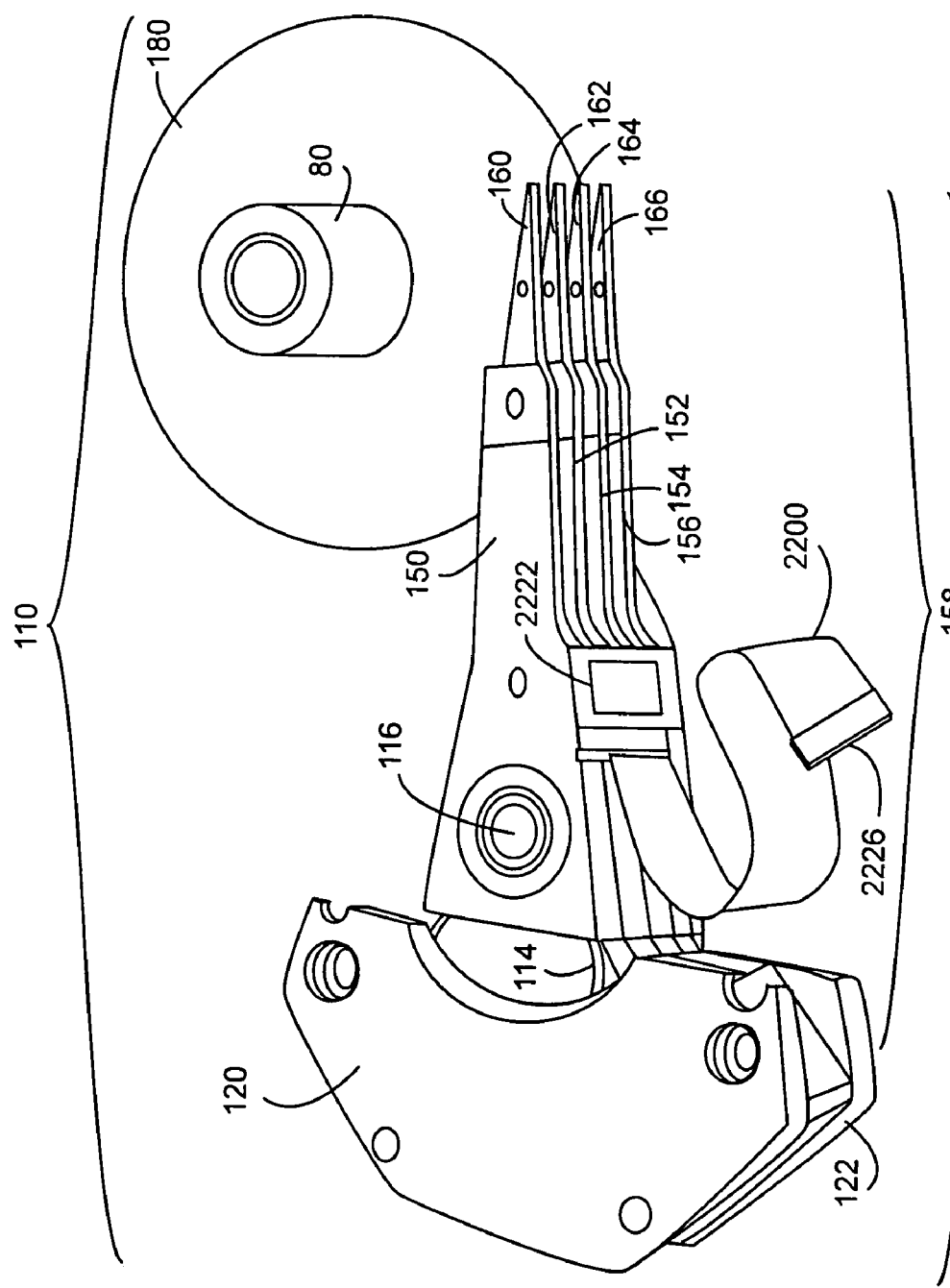
FIG. 8 shows the hard disk drive including a voice coil actuator, including an actuator assembly, that includes the head gimbal assembly of FIGS. 2B, 2D and 2E.

FIG. 7A shows a cross section view of the second scheme with the first mechanical coupling 962 of the piezoelectric device 300 and the third mechanical coupling 964 of the second piezoelectric device 310 to the first contact region 1022 of FIGS. 2B and 2C. FIG. 7B shows the top view of the first contact region 1022 of FIG. 7A with the piezoelectric device 300 removed. A first conductive trace 1084, that traverses the first outer arm 1050 and the first arm 1030, conductively couples to the first electrical coupling 1072. FIG. 7C shows a cross section view of the second scheme with the third mechanical coupling 964 of the second piezoelectric device 310 to the first contact region 1022 of FIG. 2D. FIG. 7D shows a cross section view of the second scheme with the first mechanical coupling 962 of the piezoelectric device 300 to the first contact region 1022 of FIG. 2E. FIG. 8 shows the hard disk drive 110 including a voice coil actuator 118, including an actuator assembly 158, that includes the head gimbal assembly 160 of FIGS. 2B, 2D and 2E. FIGS. 9A and 9B show the hard disk drive 110 of FIG. 8 with the slider 500 moving over a rotating disk surface 180, being positioned by the piezoelectric device 300 through the invention's region 1000 in accord with the operations discussed for FIGS. 3A and 3B. FIG. 20 shows an exploded view of the primary components of the hard disk drive 110 of FIGS. 8 to 9B.

In FIGS. 8 to 9B, the actuator arm 150 preferably includes the head gimbal assembly of FIGS. 2B, 2D, and 2E. The actuator assembly 158 preferably includes the actuator arm 150. The actuator assembly 158 is included in the voice coil actuator 118.

The invention includes the voice coil actuator 118 shown in FIGS. 8 to 20 built with the flex circuitry 2200 coupled through at least one flexure cable 200 with the head gimbal assembly 160. The voice coil actuator 118 may include coupling more than one head gimbal assembly through more than one flexure cable. By way of example, the flex circuitry 2200 may couple through a second flexure cable 220 with a second head gimbal assembly 162. The flex circuitry 2200 may couple through a third flexure cable 260 with a third head gimbal assembly 164. The flex circuitry 2200 may couple through a fourth flexure cable 280 with a fourth head gimbal assembly 166.

As shown in FIGS. 8 to 20, an actuator arm may include more than one head gimbal assembly. By way of example, the second actuator arm 152 may preferably include the second head gimbal assembly 162 and the third head gimbal assembly 164. Such an actuator arm may be preferred to minimize manufacturing expense in accessing two rotating disk surfaces (that are not shown) and may further improve the overall reliability of the hard disk drive 110.

The invention also includes the hard disk drive 110 built with the voice coil actuator 118. The voice coil actuator 118 includes an assembly of at least one actuator arm 150, and as shown, may include additional actuator arms 152, 154 and 156. A disk surface is shown, that when the invention is in operation, rotates about spindle 80 to create the rotating disk surface 180.

The voice coil actuator 118 includes the actuator assembly 158 pivoting about the actuator pivot 116. The actuator assembly 158 includes the actuator arm 150 coupled with the voice coil 114. When the voice coil 114 is electrically stimulated with a time-varying electrical signal, it inductively interacts with a fixed magnet attached to the voice coil yoke 120, causing the actuator arm 150 to pivot by lever action through the actuator pivot 116. Typically, the fixed magnet is composed of two parts, one attached to the voice coil yoke 120 and the other attached to the bottom voice coil yoke 122. As the actuator arm 150 pivots, the head gimbal assembly 160 is moved across the rotating disk surface 180. This provides the coarse positioning of the slider 500, and consequently the read-write head 90 over the specific track 190.

FIG. 21 shows a schematic view of the electrical interconnection of the embedded disk controller printed circuit board 2000 with the read-write head 90, the piezoelectric device 300, and at least one head gimbal assembly 160, that is used to provide fine positioning for the read-write head 90.

In FIG. 21, the first conductive trace 1084 of FIGS. 5C and 7B is one of two signals in the piezo-control signal bundle 2310 in the flexure cable 200. The piezo-control signal bundle 2310 further includes a second signal, that is the second conductive trace 1086.

In certain preferred embodiments, there may be more than one flexure cable, as shown in FIG. 21. In certain further preferred embodiments, the piezo-control signal bundles may each conduct through a shared signal bundle 360. The second flexure cable 220 may include the second piezo-control signal bundle 2312 conducting the shared signal bundle 360. The third flexure cable 260 may include the third piezo-control signal bundle 2314 conducting the shared signal bundle 360. The fourth flexure cable 280 may include the fourth piezo-control signal bundle 2316 conducting the shared signal bundle 360.

In FIG. 21, the flex circuitry 2200 may preferably include a read-write preamplifier 2222 coupling with the read differential signal pair r0+ r0− and the write differential signal pair w0+ w0−. The read and write differential signal pairs electrically couple with the read-write head 90 within the slider 500, as shown in FIGS. 2B to 2E. A flex connector 2226 may preferably couple to the printed circuit board connector 2230 to provide piezo-controls 1016 to the shared signal bundle 360 and the preamplifier signal interactions 2150 with the read-write preamplifier 2222. The channel interface 2140 interacts 2152 through the connectors to provide the preamplifier signal interactions 2150 of the read-write preamplifier 2222. The piezo driver 2010 provides the raw piezo drive signal bundle 1014 to the printed circuit board connector 2230.

In FIG. 21, a computer 2100 preferably directs the channel interface 2140 and the servo-controller 2030. As used herein a computer will include, but is not limited to, an instruction processor. The instruction processor includes at least one instruction processing element and at least one data processing element, each data processing element controlled by at least one instruction processing element. A computer may also include, but is not limited to, at least one finite state machine, at least one inference engine and at least one neural network.

In FIG. 21, the servo-controller 2030 interacts through servo-signaling 2032 with the computer 2100. The servo-controller 2030 also receives at least one position feedback signal 2034. The position feedback signal 2034 often and preferably includes a Position Error Signal (PES). The position feedback signal 2034 is preferably used in the dynamic control system formed by the computer 2100, the servo-controller 2030 and the piezoelectric device 300 to move the slider 500 in accord with the invention.

More specifically, the fine motion control provided by the operations of FIGS. 3A and 3B may preferably position the slider 500 over a small number of neighboring tracks to a specific track 190 as shown in FIG. 9B. By way of example, the small number of neighboring tracks may number less than twenty. The small number of neighboring tracks may further number less than ten. The small number of neighboring tracks may preferably number about five.

The positioning of the slider 500 may be at least partly implemented by a program system 2128 as shown in FIG. 21. The program system 2128 preferably includes program steps residing in the memory 2120. The memory 2120 is accessibly coupled 2122 with the computer 2100.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method, comprising the step of:
operating a hard disk drive including a head gimbal assembly (160) further including a flexure layer (990) further including a piezoelectric device (300) mechanically coupled to a mounting face (1020) and a slider (500) mechanically coupled to a slider mounting face (1010), further comprising the step of
moving said slider by applying potential differences across terminals (306, 308) of said piezoelectric device to apply asymmetric forces across said mounting face (1020), comprising the steps of:
applying a first potential difference to electrically stimulate said piezoelectric device to contract and apply a first asymmetric force across said mounting face to move said slider in a first direction (1080) through a mechanical coupling (960); and
applying a second potential difference to electrically stimulate said piezoelectric device to expand and apply a second asymmetric force across said mounting face to move said slider in a second direction (1082);
wherein said flexure layer is primarily composed of a stiff material; and
wherein said mounting face includes a first notch and a slot providing said asymmetry.

2. The method of claim 1, wherein said stiff material is a form of stainless steel.

3. The method of claim 1, wherein said stiff material has comparable or greater stiffness than a form of stainless steel.

4. The method of claim 3, wherein said stiff material is primarily composed of a metallic alloy.

5. The method of claim 3, wherein said stiff material is primarily composed of a form of at least one hydrocarbon compound.

6. The method of claim 1, wherein the thickness of said flexure layer is at most fifty micro-meters.

7. The method claim 6, wherein said thickness is between ten micro-meters and forty micro-meters.

8. The method of claim 7, wherein said thickness is between twenty-five micro-meters and thirty five micro-meters.

9. The method of claim 6 wherein said thickness is further limited to at most thirty micro-meters.

10. The method of claim 1, wherein said head gimbal assembly further comprising and using a flexure cable, comprising and using: said flexure layer.

11. The method of claim 10 wherein said flexure cable, further comprising:
a first arm (1030) coupling said mounting face to a first mount (1042) of a slider bridge (1040);
a second arm (1032) coupling said mounting face to a second mount (1044) of said slider bridge;
a first outer arm (1050) coupling to said first mount of said slider bridge and traversing essentially in parallel to said first arm to a flexure tab (1060); and
a second outer arm (1052) coupling to said second mount of said slider bridge and traversing essentially in parallel to said second arm to said flexure tab.

12. The method of claim 11, wherein said head gimbal assembly, comprising:
said flexure cable including:
said piezoelectric device mechanically coupled to said mounting face; and
said slider mechanically coupled to said slider mounting face.

13. The method of claim 12, wherein said flexure cable further comprises:
a first conductive trace (1084) traversing said first outer arm and traversing said first arm to conductively couple to a first electrical coupling (1072) near said mounting face; and
a second conductive trace (1086) traversing said second outer arm and traversing said second arm to conductively couple to a second electrical coupling (1074) near said mounting face;
wherein said head gimbal assembly, further comprises:
a first connection of said first electrical coupling to a first of said terminal (306) of said piezoelectric device; and
a second connection of said second electrical coupling to a second of said terminal (308) of said piezoelectric device.

14. The method of claim 1, wherein the step operating said hard disk drive further comprising the step of:
rotating a disk surface in a hard disk drive to create a rotating disk surface;
wherein the step of said slider moving in said first direction is further comprised of the step of:
said slider moving in said first direction across said rotating disk surface.

15. A method, comprising the step of
moving a slider (500) by applying potential differences across terminals (206, 208) of at least one piezoelectric device (300) to stimulate said piezoelectric device to apply asymmetric forces across a mounting face (1020), with said mounting face providing an asymmetry based upon a first notch (1026), a slot 1110 and a first mechanical coupling (962) of said piezoelectric device and a first contact region (1022) and a second contact region (1024) of said mounting face,
wherein the step moving said slider comprising the steps of:
applying a first potential difference across said terminals to electrically stimulate said piezoelectric device to contract and apply a first asymmetric force across an mounting face (1020) to move said slider in a first direction (1080) through a second mechanical coupling (960); and
applying a second potential difference across said terminals to electrically stimulate said piezoelectric device to expand to apply a second asymmetric force across said mounting face to move said slider in a second direction (1082).

16. The method of claim 15, further comprising the step of:
rotating a disk surface in a hard disk drive to create a rotating disk surface;
wherein the step of said slider moving in said first direction is further comprised of the step of:
said slider moving in said first direction across said rotating disk surface.

17. The method of claim 15, further comprising the step of:
rotating a disk surface in a hard disk drive to create a rotating disk surface;
wherein the step of said slider moving in said second direction is further comprised of the step of:
said slider moving in said second direction across said rotating disk surface.

18. A hard disk drive, including:
a slider (500),
at least one piezoelectric device (300) including terminals (206, 208),
a mounting face (1020) coupled to said piezoelectric device and to said slider and including a first notch (1026) and a slot (1110),
with said mounting face configured to provide an asymmetry to said slider in response to said first notch, said slot and said piezoelectric device coupling through a contact region (1022) and a second contact region (1024),
with said slider configured to move in response to potential differences applied across said terminals to stimulate said piezoelectric device to apply asymmetric forces across said mounting face,
said hard disk drive further comprising:
means for applying a first potential difference to electrically stimulate said at least one piezoelectric device to contract to apply a first asymmetric force across said mounting face to move said slider in a first direction through a mechanical coupling; and
means for applying a second potential difference to electrically stimulate said piezoelectric device to contract to apply a second asymmetric force across said mounting face to move said slider in a second direction.

19. The hard disk drive of claim 18, further comprising:
means for rotating a disk surface in a hard disk drive to create a rotating disk surface;
wherein the means of said slider moving in said first direction, further comprising:
means for said slider moving in said first direction across said rotating disk surface.

20. The hard disk drive of claim 18, further comprising:
means for rotating a disk surface in a hard disk drive to create a rotating disk surface;
wherein the means for said slider moving in said second direction further comprising:
means for said slider moving in said second direction across said rotating disk surface.

21. The hard disk drive of claim 18, wherein at least one member of a group consisting of said means for applying said first potential difference and said means for applying said second potential difference, said member includes a region (1000) of a flexure layer (990), comprising:
said slider mounting face coupled to said mounting face for said at least one piezoelectric device;
said mounting face for said piezoelectric device providing said asymmetry between said first contact region and said second contact region;
wherein said flexure layer is primarily composed of a stiff material.

22. The hard disk drive of claim 21, wherein said stiff material is a form of stainless steel.

23. The hard disk drive of claim 21, wherein said stiff material has comparable or greater stiffness than a form of stainless steel.

24. The hard disk drive of claim 23, wherein said stiff material is primarily composed of a metallic alloy.

25. The hard disk drive of claim 23, wherein said stiff material is primarily composed of a form of at least one hydrocarbon compound.

26. The hard disk drive of claim 21, wherein the thickness of said flexure layer is at most fifty micro-meters.

27. The hard disk drive of claim 26, wherein said thickness is at least ten micro-meters.

28. The hard disk drive of claim 26, wherein said thickness of said flexure layer is further limited to at most thirty micro-meters.

29. The hard disk drive of claim 21, wherein said flexure cable, further comprising:
a first arm (1030) coupling said mounting face to a first mount (1042) of a slider bridge (1040);
a second arm (1032) coupling said mounting face to a second mount (1044) of said slider bridge;
a first outer arm (1050) coupling to said first mount of said slider bridge and traversing essentially in parallel to said first arm to a flexure tab (1060); and
a second outer arm (1052) coupling to said second mount of said slider bridge and traversing essentially in parallel to said second arm to said flexure tab.

30. The hard disk drive of claim 21, wherein at least one of said members further comprises a head gimbal assembly, comprising:
a flexure cable including: said flexure layer with
said piezoelectric device mechanically coupled to said mounting face; and
said slider mechanically coupled to said slider mounting face.

31. The hard disk drive of claim 30, wherein said flexure cable further comprises:
a first conductive trace (1084) traversing said first outer arm and traversing said first arm to conductively couple to a first electrical coupling (1072) near said mounting face; and
a second conductive trace (1086) traversing said second outer arm and traversing said second arm to conductively couple to a second electrical coupling (1074) near said mounting face;
wherein said head gimbal assembly, further comprises:
a first connection of said first electrical coupling to a first of said terminal (306) of said piezoelectric device; and
a second connection of said second electrical coupling to a second of said terminal (308) of said piezoelectric device.

* * * * *